(12) United States Patent
Hamad et al.

(10) Patent No.: US 8,829,110 B2
(45) Date of Patent: Sep. 9, 2014

(54) NANOCOMPOSITE BIOMATERIALS OF NANOCRYSTALLINE CELLULOSE (NCC) AND POLYLACTIC ACID (PLA)

(75) Inventors: Wadood Y. Hamad, Vancouver (CA); Chuanwei Miao, Richmond, CA (US)

(73) Assignee: FPInnovations, Pointe-Claire, Quebec (CA)

( * ) Notice: Subject to any disclaimer, the term of this patent is extended or adjusted under 35 U.S.C. 154(b) by 322 days.

(21) Appl. No.: 13/014,205

(22) Filed: Jan. 26, 2011

(65) Prior Publication Data
US 2011/0196094 A1    Aug. 11, 2011

Related U.S. Application Data

(63) Continuation of application No. 61/303,347, filed on Feb. 11, 2010.

(51) Int. Cl.
| | | |
|---|---|---|
| *C08B 37/00* | (2006.01) | |
| *C08G 63/48* | (2006.01) | |
| *C08G 63/91* | (2006.01) | |
| *C08G 18/38* | (2006.01) | |
| *C08L 1/08* | (2006.01) | |
| *B82Y 40/00* | (2011.01) | |
| *C08G 63/08* | (2006.01) | |
| *D01F 1/10* | (2006.01) | |
| *D01F 6/62* | (2006.01) | |
| *C08L 67/04* | (2006.01) | |
| *C08L 1/02* | (2006.01) | |
| *B82Y 30/00* | (2011.01) | |
| *C08J 5/18* | (2006.01) | |

(52) U.S. Cl.
CPC . *C08L 1/02* (2013.01); *B82Y 40/00* (2013.01); *C08G 63/08* (2013.01); *D01F 1/10* (2013.01); *D01F 6/625* (2013.01); *C08L 67/04* (2013.01); *C08J 2367/04* (2013.01); *C08J 2301/02* (2013.01); *C08L 2205/14* (2013.01); *B82Y 30/00* (2013.01); *C08J 5/18* (2013.01)
USPC ........................................... 525/54.3; 524/35

(58) Field of Classification Search
USPC ............................................. 524/35; 525/54.3
See application file for complete search history.

(56) References Cited

U.S. PATENT DOCUMENTS 5,578,691 A * 11/1996 Narayan et al. ............... 527/300
5,616,671 A * 4/1997 Narayan et al. ............... 527/300
(Continued)

FOREIGN PATENT DOCUMENTS

CN      101168616 A  *  4/2008
JP      2009029927       2/2009
(Continued)

OTHER PUBLICATIONS

Chen et al. (Materials Science and Engineering C, 11, 2000, 57-60).*
(Continued)

*Primary Examiner* — Liam J Heincer
(74) *Attorney, Agent, or Firm* — Norton Rose Fulbright Canada LLP (57) ABSTRACT

A new approach is conceived for the development of sustainable biomaterials comprising nanocrystalline cellulose (NCC) and polylactic acid (PLA) nanocomposites. The invention deals with advancing a method based on in situ ring opening polymerization of L-lactide in the presence of NCC particles to form NCC-PLA supramolecular nanocomposite materials. This material is hydrophobic and compatible with a wide range of synthetic and natural polymers. NCC-PLA nanocomposites have enhanced functionality (e.g. gas barrier), rheological and mechanical performance, as well as dimensional stability (i.e. less hygroexpansivity) relative to PLA. They are made from entirely renewable resources, and are potentially biocompatible as well as recyclable. NCC-PLA supramolecular nanocomposites can be suspended in most organic solvents or dried to form a solid substance. They can be processed using conventional polymer processing techniques to develop 3-dimensional structures, or spun into fibers, yarns or filaments.

24 Claims, 5 Drawing Sheets

(56) References Cited

U.S. PATENT DOCUMENTS

| | | | |
|---|---|---|---|
| 5,731,402 A * | 3/1998 | Nishida et al. | 528/222 |
| 5,817,728 A * | 10/1998 | Higuchi et al. | 527/300 |
| 5,914,381 A * | 6/1999 | Terado et al. | 527/300 |
| 7,256,223 B2 * | 8/2007 | Mohanty et al. | 523/124 |
| 7,884,169 B2 * | 2/2011 | Shiraishi | 527/311 |
| 2003/0017319 A1 * | 1/2003 | Hamad et al. | 428/297.4 |
| 2004/0030043 A1 * | 2/2004 | Aranishi et al. | 525/54.3 |
| 2005/0209355 A1 * | 9/2005 | Roitman | 522/1 |
| 2006/0235113 A1 * | 10/2006 | Dorgan et al. | 524/13 |
| 2007/0032577 A1 * | 2/2007 | Kanzawa et al. | 524/31 |
| 2007/0161095 A1 * | 7/2007 | Gurin | 435/134 |
| 2007/0203261 A1 * | 8/2007 | Narayan et al. | 523/205 |
| 2008/0118765 A1 | 5/2008 | Dorgan | |
| 2008/0146701 A1 * | 6/2008 | Sain et al. | 524/9 |
| 2008/0306235 A1 * | 12/2008 | Shiraishi | 527/311 |
| 2009/0286098 A1 * | 11/2009 | Yajima et al. | 428/507 |
| 2009/0292046 A1 * | 11/2009 | Dorgan et al. | 524/13 |
| 2010/0125112 A1 * | 5/2010 | Chung et al. | 523/205 |
| 2010/0216909 A1 * | 8/2010 | Berg Gebert et al. | 523/128 |
| 2010/0240806 A1 * | 9/2010 | Kondo | 524/35 |
| 2011/0071238 A1 * | 3/2011 | Bastioli et al. | 524/17 |

FOREIGN PATENT DOCUMENTS

| | | |
|---|---|---|
| WO | 2006001076 | 1/2006 |
| WO | 2007136086 | 11/2007 |

OTHER PUBLICATIONS

Teramoto et al. (Polymer 44, 2003, 2701-2709).*
Machine Translation of CN 101168616 A, 2012.*
Kim et al. Polym. Int. 51, 1123-1128, 2002.*
Lonnberg et al. Biomacromolecules, 2006, 7, 2178-2185.*
Dubois et al. Macromolecules 1996, 29, 1965-1975.*
Nordgren et al., Applied Materials and Interfaces, vol. 1, No. 10, 2098-2103, 2009.*
V. Favier, G.R. Canova, J.Y. Cavaille, H. Chanzy, A. Dufresne, C. Gauthier, Polym. Adv. Technol. 6 (1995) 351-355.
V. Favier, G.R. Canova, S.C. Shrivastava, J.Y. Cavaille, Polym. Eng. Sci. 37 (1997) 1732-1739.
J.R. Capadona, K. Shanmuganathan, D.J. Tyler, S.J. Rowan, C. Weder, Science 319 (2008) 1370-1374.
K. Oksman, A.P. Mathew, D. Bondeson, I. Kvien, Compos. Sci. Technol. 66 (2006) 2776-2784.
L. Petersson, I. Kvien, K. Oksman, Compos. Sci. Technol. 67 (2007) 2535-2544.
D. Bondeson, K. Oksman, Compos. A 38 (2007) 2486-2492.
D. Bondeson, K. Oksman, Compos. Interfaces 14 (2007) 617-630.
A.P. Mathew, A. Chakraborty, K. Oksman, M. Sain, The structure and mechanical properties of cellulose nanocomposites prepared by twin screw extrusion, In Cellulose nanocomposites-processing, characterization and properties, K. Oksman, M. Sain, American Chemical Society, 2006, p. 114-131.
N. Lin, G. Chen, J. Huang, A. Dufresne, P.R. Chang, J. Appl. Polym. Sci. 113 (2009) 3417-3425.
Funabashi, M., Kunioka, M. "Biodegradable composites of poly(lactic acid) with cellulose fibers polymerized by aluminium triflate." Macromolecular Symposia. 224. Published Apr. 2005 (May 30, 2005). pp. 309-321 *whole document*.
International Search Report, PCT/CA2011/000096, Apr. 7, 2011.
Supplementary European Search Report issued Aug. 20, 2013—EP 11741768.
English language Abstract of JP 2009029927.

* cited by examiner

NANOCOMPOSITE BIOMATERIALS OF NANOCRYSTALLINE CELLULOSE (NCC) AND POLYLACTIC ACID (PLA)

CROSS-REFERENCE TO RELATED APPLICATION

This application claims the benefit under 35 USC 119 (e) of U.S. Provisional Application Ser. No. 61/303,347, filed Feb. 11, 2010.

BACKGROUND OF THE INVENTION i) Field of the Invention

This invention relates to a nanocomposite of nanocrystalline cellulose (NCC) and polylactic acid (PLA), and a process for producing such a nanocomposite. The nanocomposite is a sustainable, thermally-stable biomaterial which is hydrophobic and compatible with a wide range of synthetic and natural polymers. NCC-PLA nanocomposites have enhanced mechanical performance and dimensional stability (i.e. less hygroexpansivity) relative to PLA, and are potentially biocompatible, recyclable and made from entirely renewable resources. NCC-PLA nanocomposites can be suspended in many organic solvents or dried to form a solid substance that can be processed using conventional polymer processing techniques to develop 3-dimensional structures.

ii) Description of the Prior Art

The 20$^{th}$ century has been characterized, amongst many things, as the plastics century. It is impossible to imagine the current world without plastics. Products range from baby bottles to packaging materials to components in aircraft. While polyolefins have been the basis of almost all commercial plastic development, questions have been raised about their long-term applications due to concerns over recycling, health and environmental responsibility—e.g., the need to use chemical building blocks, such as bisphenol A (BPA), in the manufacture of polycarbonate plastics and epoxy resins.

In response, serious efforts have been rendered to develop bioplastics and biomaterials made from renewable resources. Nanocrystalline cellulose (NCC) is highly crystalline cellulose extracted from woody or nonwoody biomass. Polylactic acid (PLA) is a thermoplastic, aliphatic polyester made up of lactic acid (2-hydroxy propionic acid) building blocks. PLA is derived from renewable plant sources, such as starch and sugar, and has potential applications in medicine, engineering and food and beverage packaging. The degradation of PLA can be achieved through the hydrolysis of the ester bonds without the need for enzymatic treatment. However, PLA has certain limitations compared to polyolefins, particularly during processing, which has greatly limited its use. PLA is essentially hygroscopic and possesses low thermal resistance. Nano-scale reinforcement can be used to enhance the rheological, mechanical and physical properties of polymers, thereby improving their processability, functionality and end-use performance. NCC can function as high performance reinforcement owing to its large specific surface area, high strength and high surface reactivity. To achieve this, two critical conditions are required: (i) excellent dispersion of the NCC within the polymer matrix, and (ii) perfect compatibility between the two in order to produce excellent interfacial mechanics in various environments.

Studies have shown that NCC can be used to increase the storage modulus of some nanocomposites by orders of magnitude above the glass transition temperature of the matrix [1-3]. By compounding NCC with PLA, it is possible to make a biomaterial, made from entirely renewable resources, with satisfactory properties. However, since NCC is hydrophilic and PLA hydrophobic, compatibility becomes a critical and difficult issue. Published results have indicated it is practically impossible to prepare NCC-PLA nanocomposites by directly compounding PEA and unmodified, or only physically modified using surfactants or polymer compatibilizers, NCC [4-8]. A more recent study demonstrated that the dispersion of NCC in PLA matrix can be improved by grafting NCC with polycaprolactone (PCL) [9]. However, aggregation of the nanoparticles was still observed in such a system and the improvement in the mechanical properties of the resulting nanocomposite was limited.

SUMMARY OF THE INVENTION

It is an object of this invention to provide a nanocomposite of nanocrystalline cellulose (NCC) and polylactic acid (PLA).

It is another object of this invention to provide a process for producing a nanocomposite of nanocrystalline cellulose (NCC) and polylactic acid (PLA).

It is still another object of this invention to provide a composition comprising a nanocomposite of the invention, compounded or blended with high molecular weight PLA.

In one aspect of the invention, there is provided a nanocomposite of nanocrystalline cellulose (NCC) and polylactic acid (PLA) in which said PLA is grafted on said NCC.

In another aspect of the invention, there is provided a process for producing a nanocomposite of nanocrystalline cellulose (NCC) and polylactic acid (PLA) comprising ring-opening polymerization of L-lactide in the presence of NCC particles, in a non-aqueous medium.

In yet another aspect of the invention, there is provided a composition comprising a nanocomposite of the invention, compounded or blended with a polymer selected from PLA, poly(hydroxybutyrate), PHB or poly(hydroxyalcanoate), PHA; for example high molecular weight PLA.

The latter compounding or blending may be carried out, for example, by way of co-extrusion, injection-moulding or other polymer processing techniques.

DETAILED DESCRIPTION OF THE INVENTION

This invention deals with a new approach for the development of sustainable, thermally-stable biomaterials comprising nanocrystalline cellulose (NCC) and polylactic acid (PLA) nanocomposites. The novel approach employs in situ ring opening polymerization of NCC particles with L-lactide to form NCC-PLA nanocomposite materials. The resulting material is hydrophobic and compatible with a wide range of synthetic and natural polymers. NCC-PLA nanocomposites have enhanced mechanical performance and dimensional stability (i.e. less hygroexpansivity) relative to PLA. They are potentially biocompatible, recyclable and made from entirely renewable resources. They can be suspended in most organic solvents or dried to form a solid substance that can be processed using conventional polymer processing techniques to develop 3-dimensional structures.

Nanocrystalline cellulose (NCC) is extracted as a colloidal suspension by acid hydrolysis of typically chemical wood pulps, but other cellulosic materials, such as bacteria, cellulose-containing sea animals (e.g. tunicate), or cotton can be used. NCC is constituted of cellulose, a linear polymer of $\beta(1\rightarrow 4)$ linked D-glucose units, the chains of which arrange themselves to form crystalline and amorphous domains.

NCC obtained via hydrolytic extraction has a degree of polymerization (DP) in the range $90 \leq DP \leq 110$, and 3.7-6.7 sulphate groups per 100 anhydroglucose units. NCC comprises crystallites whose physical dimension ranges between 5-10 nm in cross-section and 20-100 nm in length, depending on the raw material used in the extraction. These charged crystallites can be suspended in water, or other solvents if appropriately derivatized, or self assemble to form solid materials via air, spray- or freeze-drying. When dried, NCC forms an agglomeration of parallelepiped rod-like structures, which possess cross-sections in the nanometer range (5-20 nm), while their lengths are orders of magnitude larger (100-1000 nm) resulting in high aspect ratios. NCC is also characterized by high crystallinity (>80%, and most likely between 85 and 97%) approaching the theoretical limit of the cellulose chains. Hydrogen bonding between cellulose chains can stabilize the local structure in NCC, and plays a key role in the formation of crystalline domains. Crystallinity, defined as the crystalline fraction of the sample, strongly influences the physical and chemical behavior of NCC. For example, the crystallinity of NCC directly influences the accessibility for chemical derivatization, swelling and water-binding properties.

The nanocomposite of the invention is hydrophobic and has improved moulding characteristics, thermo-mechanical and gas barrier properties as compared with PLA formed by ring-opening polymerization of L-lactide in the absence of NCC.

In the process the in situ polymerization whereby a graft of PLA on NCC is formed, is initiated by hydroxyl groups on the NCC, or may be partially initiated by hydroxyl groups on the NCC and partially by an added initiator providing a source of hydroxyl groups for the polymerization, for example an alcohol, suitable alcohols for the polymerization system include benzyl alcohol and 1-docecanol.

The NCC in the nanocomposite retains the crystalline characteristics of the original NCC prior to the grafting. The crystalline characteristics of PLA, when compounded or blended with NCC-PLA nanocomposite material (i.e. grafted PLA onto NCC), however, are modified by the NCC and the PLA nanocomposite attains a higher degree of crystallinity than PLA formed by ring-opening polymerization of L-lactide in the absence of NCC (ie. the parent PLA). The crystalline state of the grafted PLA, and subsequently compounded or blended materials, is more stable than that of the parent PLA.

The ring opened lactone has end carboxylic acid and hydroxyl groups; a hydroxyl of one ring opened unit forms an ester link with a carboxylic acid of another ring opened unit in the formation of the polymer chain, a chemical link or bond is formed with the NCC between a terminal carboxylic acid group of a polymer chain and a hydroxyl of NCC, thereby forming an ester linkage. Thus a single linkage is formed between each individual polymer chain and NCC. In other words the end of a grafted PLA chain is bonded to NCC via a single ester linkage formed during the polymerization process. The hydroxyl groups on NCC can, in principle, act as initiators for the polymerization of lactide.

The nanocomposite would have several or a plurality of polymer chains independently linked to each NCC nanocrystal; i.e. each NCC crystal would form a structure comprising a central crystal with several or a plurality of polymer chains radiating from it. The NCC modified in this way becomes dispersible in chloroform which is a good solvent for PLA.

The monomer conversion degree and the molecular weight of the free PLA homopolymer generated during the in situ polymerization reaction are dependent on the reaction conditions, specifically, the dosage of monomer used and concentration of NCC in the reaction medium. In general, both the monomer conversion degree, defined as the ratio of the total mass of grafted and free PLA to that of L-lactide monomer used, and the molecular weight of the resulting NCC-PLA nanocomposite material nonlinearly increase with increasing monomer dosage and NCC concentration.

For example, if the monomer-to-NCC mass ratio is held constant at 30 to 1. i.e. the mass of the L-lactide monomer is 30 times that of NCC, but NCC concentration in the solvent (e.g. DMSO) is increased from 1.5 g/100 ml to 2.5 g/100 ml, while all other conditions are maintained the same, the monomer conversion degree, the number-average molecular weight (Mn), and the weight-average molecular weight (Mw) of the NCC-PLA nanocomposite material would increase from 12.7%, 1561, and 1989 to 44.8%. 5532, and 19803, respectively.

The ring-opening polymerization is more especially, carried out under anhydrous conditions. The concentration of NCC in the non-aqueous reaction medium can typically range from 1 to 10 g/100 mL, preferably from 1.5 to 5 g/100 mL, and that of the L-lactide from 5 to 50 times the mass of the starting NCC, and preferably 15 to 30 times.

Typically the nanocomposite, after thorough washing to remove the free homopolymer and unreacted chemicals, will have a PLA grafting yield, defined as the ratio of the mass of grafted PLA to that of NCC, generally ranging from 30% to over 90%, but more generally about 85%. That is to say, the mass of PLA in the resulting nanocomposite will be 85% multiplied by the mass of the starting NCC.

In particular the polymerization is carried out in an organic solvent for example dimethyl sulfoxide (DMSO). Furthermore, the medium for the polymerization reaction can be, but not limited to, alcohols (e.g. methanol), amides (e.g. dimethylformamide), amines (e.g. pyridine), esters (e.g. ethyl acetate). ethers (e.g. 1,4-dioxane), glycol ethers (e.g. 2-butoxyethanol), halogenated solvents (e.g. chloroform), hydrocarbon solvents (e.g. toluene), and ketones (e.g. acetone).

The in situ polymerization of L-lactide in the presence of NCC leads to forming PLA of various chain lengths. Part of this PLA is grafted onto the NCC i.e. generally 30 to 90%, and typically 85%, as indicated above. What remains is the free PLA homopolymer and unreacted monomers. Purification, etc. can remove any unreacted PLA monomer and also the free PLA homopolymer.

Thus the polymerization is followed by a step of recovering the nanocomposite from the non-aqueous medium. In particular this recovery step may comprise precipitating the nanocomposite from the non-aqueous medium, and purifying the resulting precipitate by dialysis and/or centrifugation. The mass of the free PLA homopolymer generated during the reaction typically ranges from 2 to 15 times the mass of starting NCC. This is strongly dependent on the polymerization reaction conditions. However, it is found that it may be advantageous to retain some free PLA homopolymer to assist in facilitating good dispersion of the nanocomposite in subsequent processing of the nanocomposite, and ensure good interface (i.e. good compatibility). We cannot, at this stage, quantify how much free PLA homopolymer is needed. The free homopolymer thus produced is found to be advantageous for ensuring (i) uniform dispersion of the composite in any processed product, and (ii) good interface with the resin used in subsequent polymer processing, typically, but not necessarily limited to, PLA.

The ring-opening polymerization is carried out at an elevated temperature, typically of about 100° C. to about 150° C., more especially about 130° C., and generally for a period of 1 to 20 hours, more especially about 15 to 20 hours.

Conveniently, the ring-opening polymerization is carried out in the presence of a catalyst, typically a metal carboxylate catalyst, other catalysts include metal oxides, and metal alkoxides. for instance, carboxylates, oxides, and alkoxides of tin, zinc, and aluminum.

The NCC-PLA nanocomposite thus produced is a hydrophobic supramolecular material that can be dispersed in a suitable solvent or dried. For example, it can potentially be used as is or further derivatized for use as excipient for drug delivery and release. It can further be used in blended combinations with PLA and/or other biopolymers like poly(hydroxybutyrate), PHB, or poly(hydroxyaicanoate), PHA, using conventional polymer processing techniques, e.g. co-extrusion, blow, injection or compression moulding, to produce films and/or 3-dimensional mouldable products for packaging and other industrial applications. It can further still be made into an emulsion and melt- or electro-spun into fibres and/or yarns for textiles and engineering applications.

The nanocomposite of the invention thus has potential for use in a wide variety of industrial and medical applications, for example but not limited to, packaging, automotives, structural, drug release and delivery, tissue engineering, scaffolding for developing new systems for medical and/or industrial applications.

The NCC-PLA nanocomposite of the invention is a supramolecular material that can be suspended in a suitable solvent or dried and potentially used as is or further derivatized for use as excipient for drug delivery and release.

The composition of the invention comprising a nanocomposite of the invention, compounded or blended with a polymer such as PLA and/or other biopolymers like poly(hydroxybutyrate), PHB, or poly(hydroxyalcanoate), PHA, for example using conventional polymer processing techniques, e.g. co-extrusion, blow, -injection or compression moulding, may produce films and/or 3-dimensional mouldable products for packaging and other industrial applications.

The latter composition can further still be made into an emulsion and melt- or electro-spun into fibres and/or yarns for textiles and engineering applications.

Figure 1:
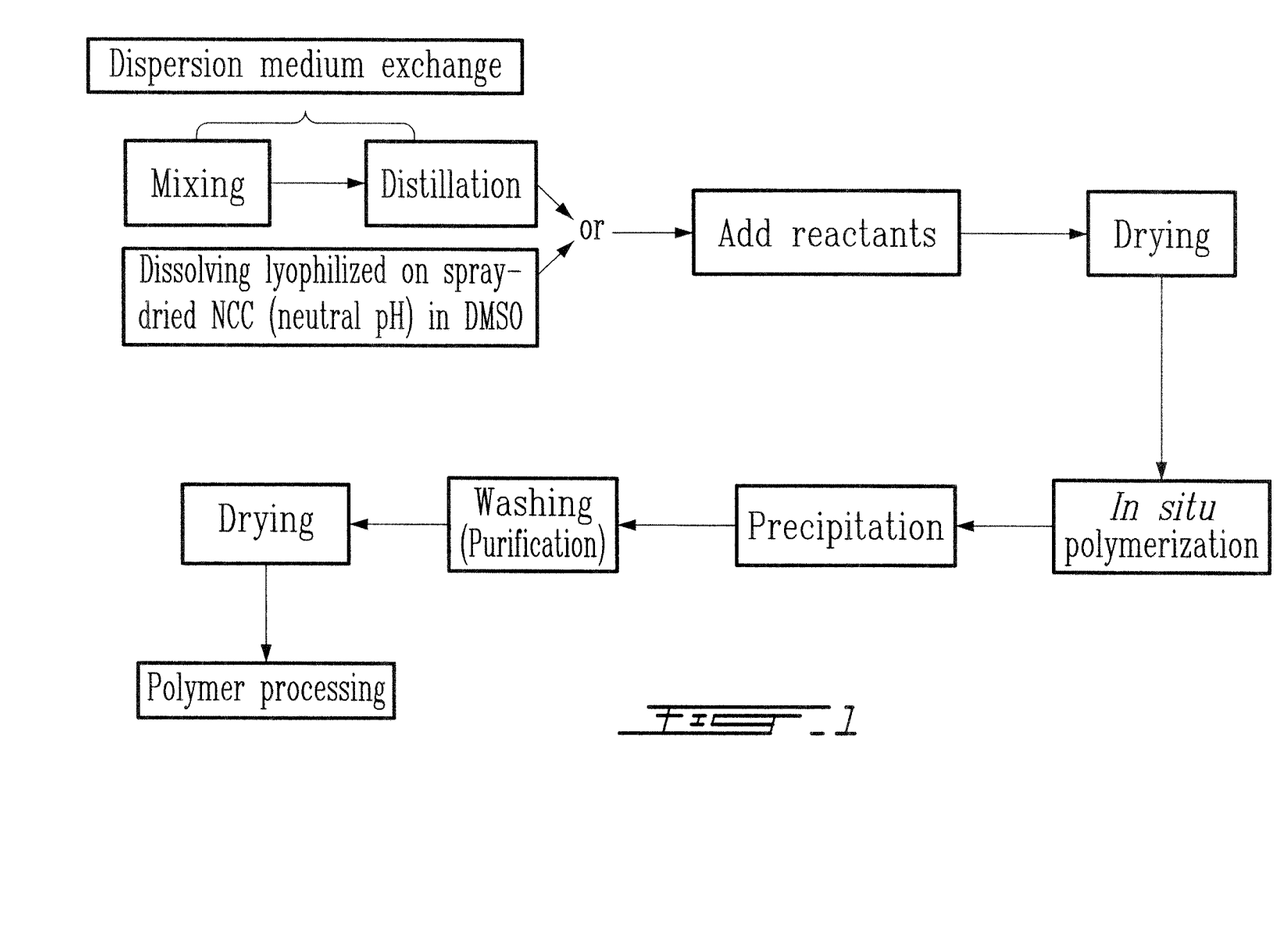
FIG. 1: is a flow chart of the procedure for in situ graft co-polymerization of L-lactide with NCC.

Preparation of NCC-PLA nanocomposites in accordance with the invention is procedurally described in FIG. 1. The central step is the in situ ring-opening polymerization of L-lactide in the presence of nanocrystalline cellulose (NCC) in a suitable organic medium. Prior to the ring opening polymerization, it is necessary to undergo dispersion medium exchange, if as is typically the case, the NCC is suspended in water. After polymerization, it is necessary to purify the product, for example, using dialysis against water and washing with methanol and, if needed, acetone. Methanol is employed to remove any unreacted monomer and catalyst, whilst acetone is employed to dissolve the free PLA homopolymer in the system, i.e. PLA not grafted onto NCC. Below is a detailed description of the polymerization process.

NCC is typically produced as a suspension of nanoparticles in water at variable concentration, for instance 4.39% w/w, and for the purpose of the current invention, the NCC suspension is titrated to neutral pH with NaOH solution. Suspension medium exchange from water to a suitable organic solvent, for instance, dimethyl sulfoxide (DMSO, typically ≥99.6%) is carried out by slowly pouring and stirring a desired volume of DMSO, for instance 110 mL, into a required mass of NCC, for instance, 30 g of NCC in water suspension. The mixture is then stirred for another reasonable period, for example 5 minutes, to allow the water and DMSO to fully mix. Water in the system is removed by distillation on a rotary evaporator (for example, BUCHI, Rotavapor R-200) in two steps. In the first step, the distillation temperature is chosen to be 83° C. and the vacuum set to 720 Torr. Towards the end of the first step, the volume of the condensed liquid in the collector is maintained constant. In the second step, the vacuum is increased to 740 Torr to distil out ~20 mL DMSO.

The dispersion medium exchange steps described above can be replaced by directly dissolving lyophilized or spray-dried dispersible NCC (neutral pH) in DMSO. The dissolving process can be facilitated using ultrasonication. The container is then sealed to prevent the DMSO from absorbing moisture and the contents stirred preferably overnight, or longer if needed.

In the NCC/DMSO suspension in a sealed flask, the following are added: (i) a suitable mass, for instance, 39.5 g of L-lactide (typical purity ≥98%), (ii) 0.4 g of a suitable catalyst, for example, Tin(II)2-ethylhexanoate (Sn(oct)$_2$, ~95%), and (iii) 0.2 g of benzyl alcohol (anhydrous, 99.8%), which is useful to improve NCC dispersion particularly at high lactide dosage. After stirring for a reasonable period, for example 5 minutes, the suspension is sonicated for 2 minutes using a probe sonicator (for example. Fisher Sonic Dismembrator, Model 300). The trace amount of residue water in the system is finally removed by passing the suspension through a 250 ml separation funnel filled with 60 g of molecular sieves (3 Å, 8-12 mesh), activated at 320° C. for at least 3 hr in advance. The dried NCC/DMSO suspension is then directly dropped, from the funnel into an oven-dried 500 ml 3-neck flask equipped with a mechanical stirrer. To prevent the DMSO from absorbing moisture, both the separation funnel and the flask are kept in nitrogen atmosphere throughout the polymerization process.

The ring-opening polymerization is carried out by soaking the sealed flask in a 130° C. oil bath for 17 hr. During the reaction, the suspension is stirred using a magnetic or mechanical stirrer at 200-500 rpm. After the reaction, the resulting product is a clear suspension with a light brown colour.

The NCC-PLA nanocomposite is precipitated from DMSO by slowly pouring the product into water with fast stirring at a ratio of 3:1 (water/product). Subsequently, purification ensues, whereby the product is dialyzed in, for instance, dialysis tubes (suggested molecular weight cut-off, MWCO=12000-14,000) against running water for at least 4 days, and/or the white precipitate is centrifuged at 4,400 rpm for a reasonable time, for example, 20 minutes using a suitable centrifugation system (for example, IEC Centra® MP4, Rotor 224). After decantation, the product is redispersed in methanol (≥99.8%) by shaking and centrifugation again. This centrifugation-decantation cycle is repeated a reasonable number of iterations, for example three times, to wash off any impurities. Finally, the washed product is dried under vacuum over a reasonable period, for instance, overnight.

A visual comparison of suspensions of pristine NCC and NCC-PLA supramolecular nanocomposite material in chloroform indicates the perfect dispersibility of the latter in a suitable organic solvent, further indicating the hydrophobicity of NCC-PLA nanocomposites.

EXAMPLE 1

Figure 2:
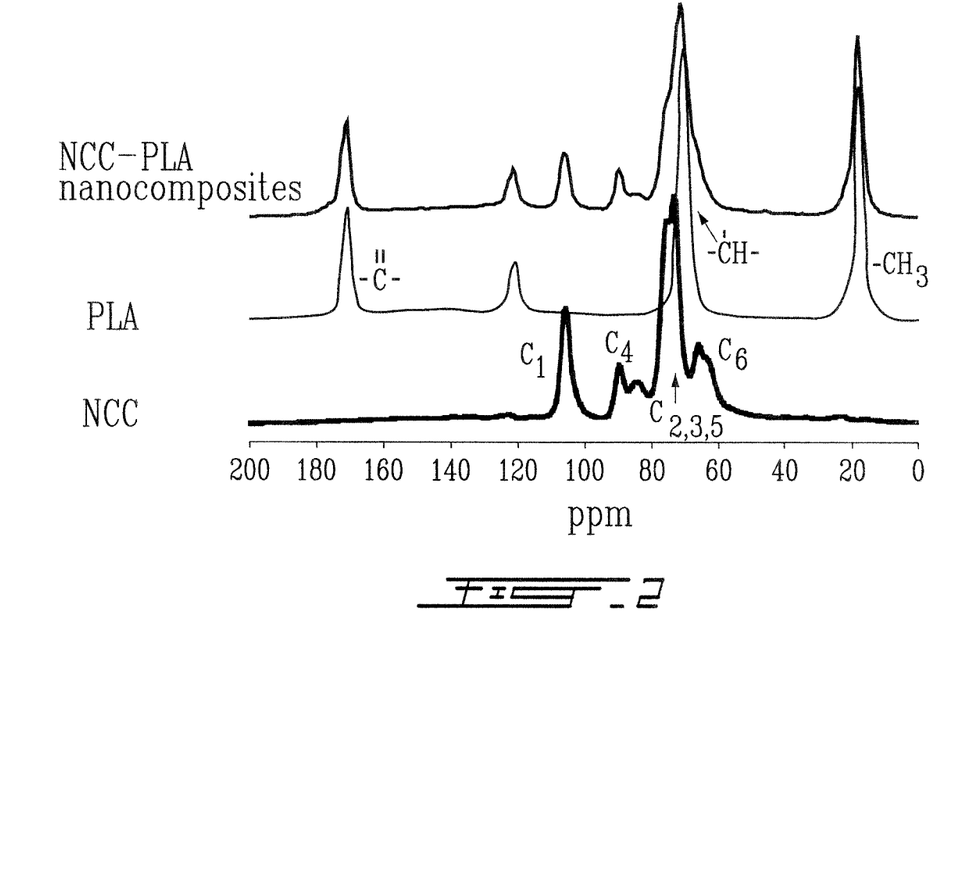
FIG. 2: is solid-state $^{13}$C nuclear magnetic resonance (NMR) spectra of NCC, PLA and NCC-PLA nanocomposites. The peaks for the nanocomposite sample match the individual ones for NCC and PLA indicating successful synthesis using in situ ring-opening polymerization of L-lactide in the presence of NCC.

NCC-PLA nanocomposite materials prepared using the in situ polymerization approach described in this invention produce particles that have a typical hydrodynamic diameter of an equivalent sphere (as determined by a Zetasizer) equal to 60.2±0.9 nm (dispersed in DMSO). The nanocomposite material disperses perfectly in typical organic solvents indicating excellent hydrophobicity. The mass ratio of grafted polymer to that of NCC is typically >80%. Solid-state $^{13}$C nuclear magnetic resonance (NMR) confirms the successful synthesis as described in FIG. 2.

EXAMPLE 2

Figure 3:
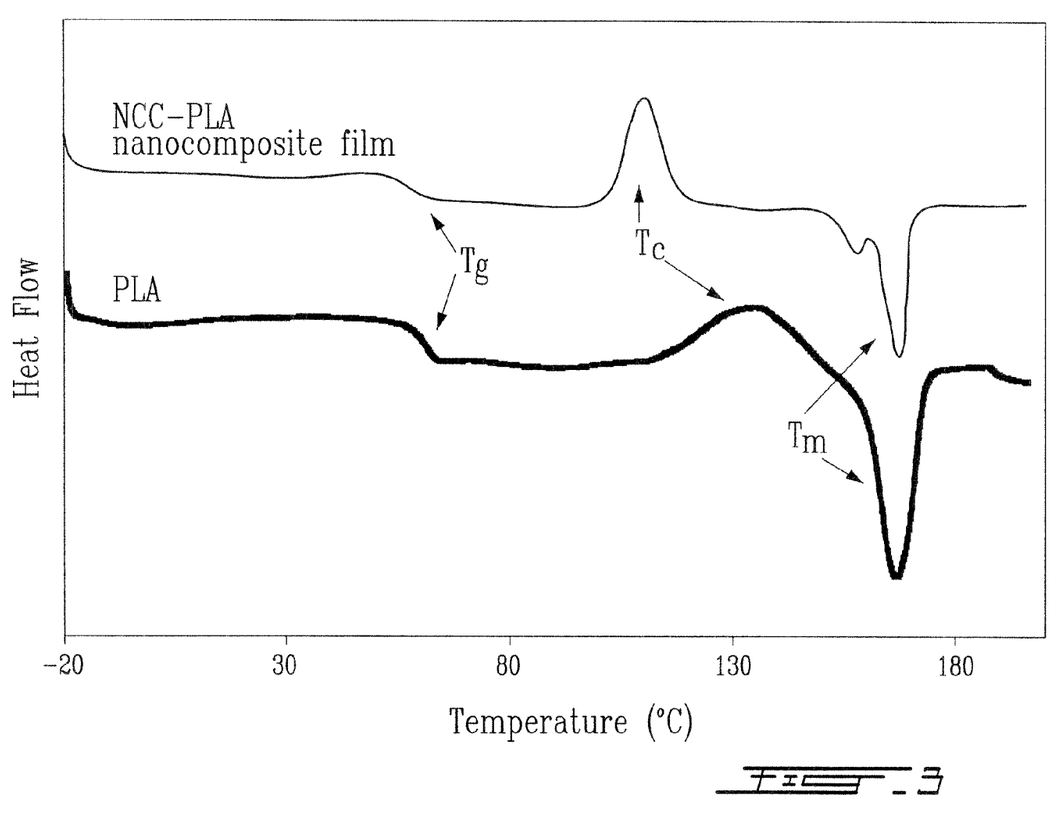
FIG. 3: is a plot of the differential scanning calorimetric responses of PLA and NCC-PLA nanocomposite films. The nanocomposite films exhibit significantly improved crystallization relative to PLA, indicating enhanced structural integrity, thermal and dimensional stability. In effect, NCC can help overcome issues with PLA processing and converting. ($T_g$=glass transition temperature; $T_c$=crystallization temperature; $T_c$=melting temperature)
Figure 4:
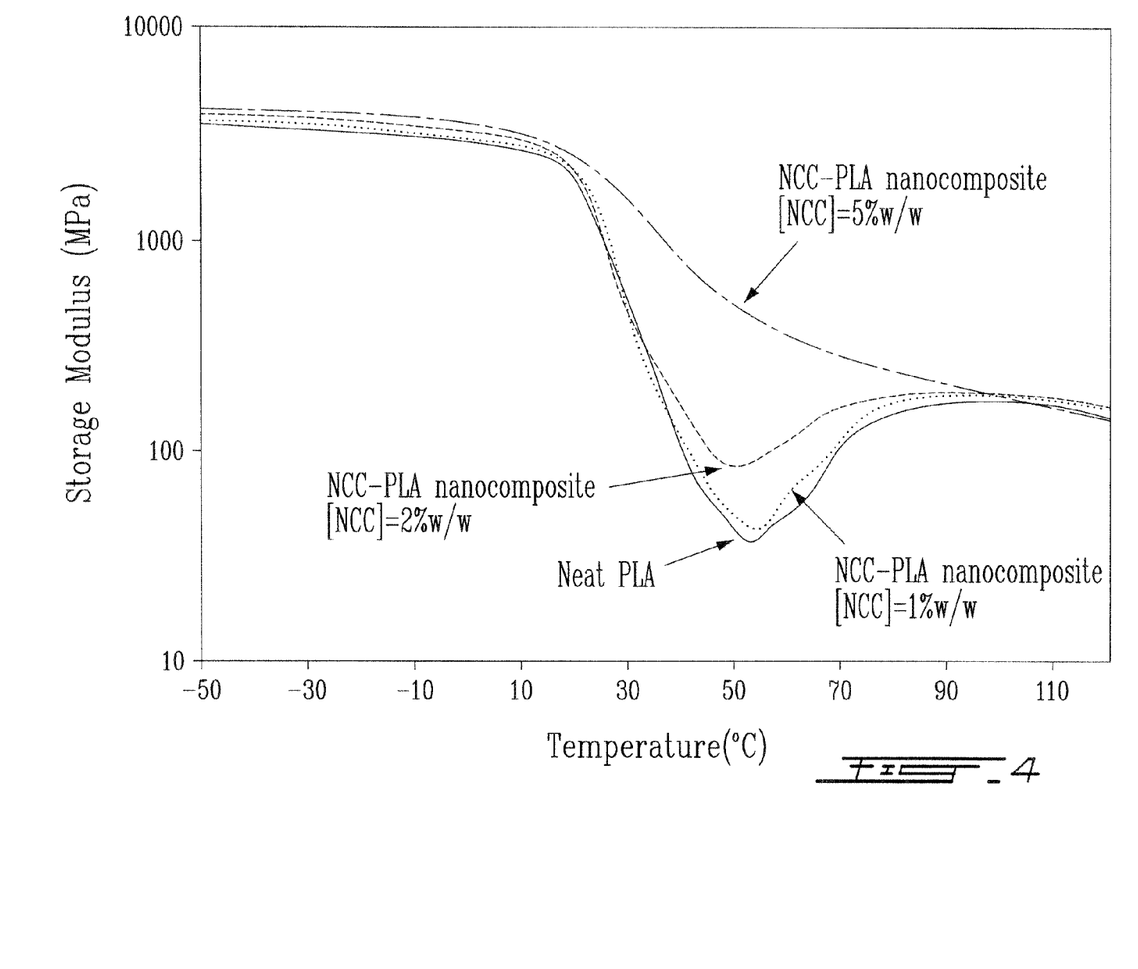
FIG. 4: is a plot of the storage modulus versus temperature indicating the dynamic mechanical response of cast films of PLA in comparison to films cast with different weight ratios of compatiblized NCC. Increased NCC loading depicts improved softening of the final product, indicating higher crystallinity. The compatibilized NCC, or the NCC-PLA supramolecular material prepared according to this invention, was blended by film casting with commercial-grade PLA.
Figure 5:
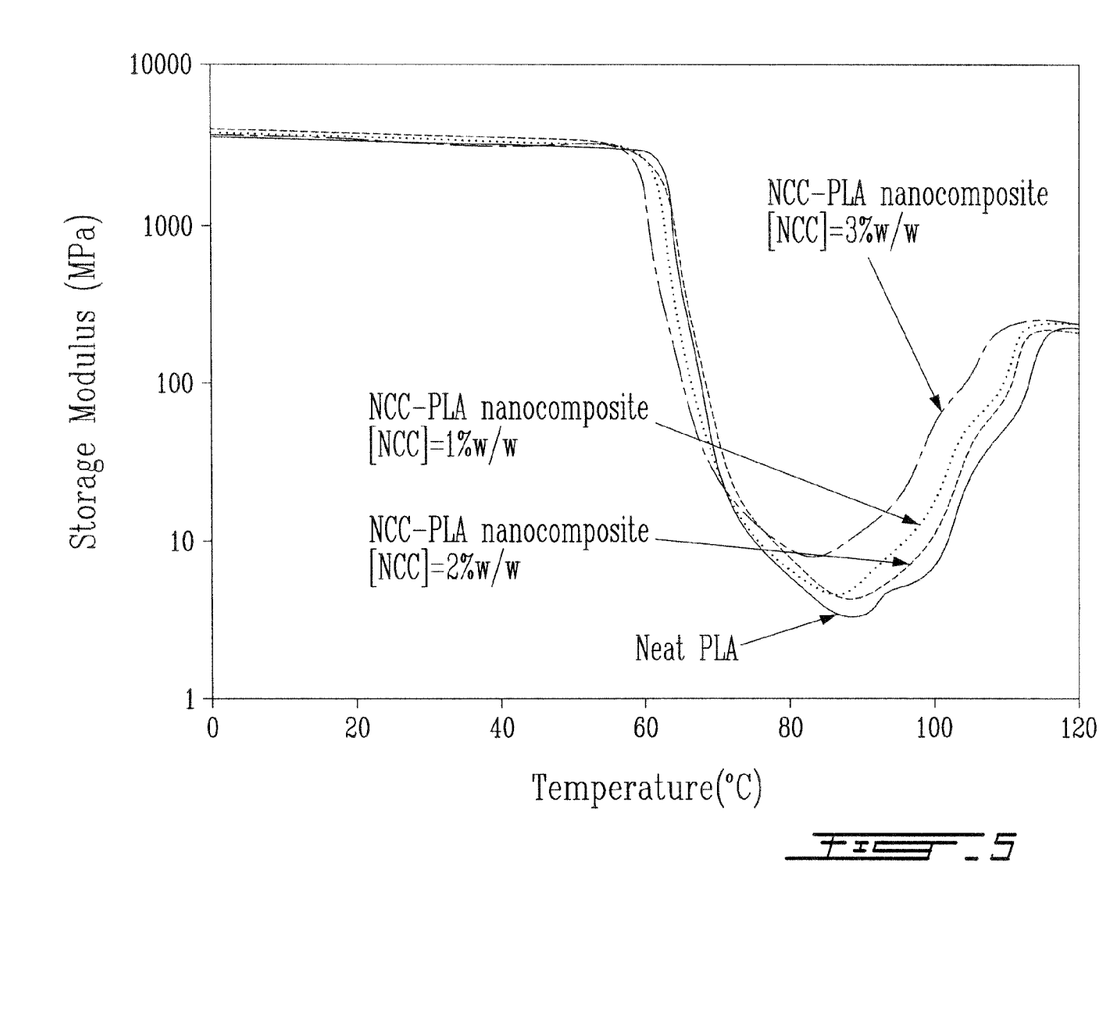
FIG. 5: is a plot of the storage modulus versus temperature indicating the dynamic mechanical response of PLA and NCC-PLA nanocomposite films prepared by a different process to those shown in FIG. 4. These samples are compounded by co-extrusion then compression moulded to form films. Fast cooling signifies this process, and the PLA is completely amorphous. Increased NCC loading evinces the ability to improve crystallinity, and therefore the mechanical response, of the final product.

The physical, mechanical and barrier properties of polymers or polymer composites are dependent on the solid-state morphology and crystallinity of the material, and processing of these composite materials can significantly impact these properties. The NCC-PLA nanocomposite material described in this invention may be processed using polymer processing techniques (e.g., film casting, extrusion/blow-moulding, injection or compression moulding, fibre spinning, etc.) to produce films, fibres, filaments and, in general, any 3-dimensional object. FIG. 3 depicts the differential scanning calorimetric responses of NCC-PLA nanocomposite films containing 5.3% w/w of NCC. These nanocomposite films exhibit significantly improved structural and thermal stability, as well as lower hygroexpansivity, compared to neat PLA films. This unique behaviour results from the ability of NCC to initiate controllable crystallization in the amorphous PLA, while maintaining the NCC structure in unperturbed state. The small and imperfect PLA crystals successively change into more stable crystals through melting and recrystallization (as indicated by the two melting peaks for NCC-PLA nanocomposites of FIG. 3). This is further evidenced by the Dynamic Mechanical Analysis data presented in FIG. 4, whereby it is indicated how the NCC-PLA supramolecular material prepared according to this invention, i.e. the compatiblized NCC, functions to improve the softening behaviour of PLA as NCC loading is increased. There is an order of magnitude increase in mechanical response as measured by, for example, the storage modulus, from 41 MPa for neat PLA to 480 MPa at 50° C. at 5% w/w NCC loading. If material processing is changed from slow cooling (FIG. 4), where crystallinity is allowed to increase to a higher magnitude, to fast cooling (FIG. 5), NCC still functions to improve the crystallinity of the resulting composite product, albeit at slower rate since the PLA in this case is completely amorphous. The difference in magnitude of improvement is principally due to the different processing techniques. Both examples, FIG. 4 and FIG. 5, yet clearly indicate the role of NCC plays in enhancing crystallinity of the final product regardless of the processing technique used.

Increased crystallinity is desirable for moulded articles for which thermal stability is important. Further, NCC-PLA nanocomposites exhibit distinctive viscoelastic behaviour with positive impact on processing and functionality. These capabilities lead to improved processability, converting and mechanical performance of the resulting objects containing NCC-PLA nanocomposite materials.

The nanocomposite of the invention can be blended or compounded with high molecular weight PLA polymer, for example a PLA polymer having a MW of 20,000 to 1,000,000, by co-extrusion, casting or other conventional blending or compounding techniques, and the presence of the nanocomposite results in a significantly reinforced PLA.

The molecular weight of the grafted PLA was determined by two indirect methods in this particular case. (1) A control experiment was performed for polymerizing lactide into PLA using the exact approach for preparing NCC-PLA nanocomposites but without NCC. The obtained polymer was analyzed using GPC. (2) The second approach involved collecting the free PLA homopolymer from the NCC-PLA preparation process, then characterizing it using $^1$H NMR. The molecular weight was calculated according to the ratio of end groups to the repeat units in the backbone. The number-averaged molecular weights (Mn) in specific examples would range between 890 and 6000, depending on the polymerization reaction conditions, indicating that the grafted PLA typically has short chain length. By balancing the reaction conditions, it is theoretically possible to allow longer chains of PLA to grow and thus produce high-molecular-weight grafted PLA onto NCC.

REFERENCES

[1] V. Favier, G. R. Canova, J. Y. Cavaille, H. Chanzy, A. Dufresne, C. Gauthier, *Polym. Adv. Technol.* 6 (1995) 351,
[2] V. Favier, G. R. Canova, S. C. Shrivastava, J. Y. Cavaille, *Polym. Eng. Sci.* 37 (1997) 1732.
[3] J. R. Capadona, K. Shanmuganathan, D. J. Tyler, S. J. Rowan, C. Weder, Science 319 (2008) 1370.
[4] K. Oksman, A. P. Mathew, D. Bondeson, I. Kvien, *Compos. Sci. Technol.* 66 (2006) 2776.
[5] L. Petersson, I. Kvien, K. Oksman, *Compos. Sci. Technol.* 67 (2007) 2535.
[6] D. Bondeson, K. Oksman, *Compos. A* 38 (2007) 2486.
[7] D. Bondeson, K. Oksman, *Compos. Interfaces* 14 (2007) 617.
[8] A. P. Mathew, A. Chakraborty, K. Oksman, M. Sain, The structure and mechanical properties of cellulose nanocomposites prepared by twin screw extrusion, In *Cellulose nanocomposites-processing, characterization and properties*, K. Oksman, M. Sain, American Chemical Society, 2006, p. 114.
[9] N. Lin, G. Chen, J. Huang, A. Dufresne, P. R. Chang, *J. Appl. Polym. Sci.* 113 (2009) 3417.

The invention claimed is:

1. A particulate nanocomposite of nanocrystalline cellulose (NCC) particles and polylactic acid (PLA) in which said PLA is grafted on said NCC particles, each NCC particle being a non-aggregated nanocrystal and having several or a plurality of PLA polymer chains independently linked to and radiating from said nanocrystal.

2. A nanocomposite according to claim 1, in which the grafted PLA is in a mass of 30% to over 90% of the mass of NCC particles.

3. A nanocomposite according to claim 2, wherein said grafted PLA is in a mass of about 85% of the mass of NCC particles.

4. A composition comprising a nanocomposite of claim 1, compounded or blended using extrusion, injection- or compression-molding with a polymer selected from PLA, poly (hydroxybutyrate) (PHB) or poly(hydroxyalcanoate) (PHA).

5. A composition according to claim 4, wherein said polymer is high molecular weight PLA.

6. A composition according to claim 5, wherein said PLA has a molecular weight of 20, 000 to 1,000,000.

7. The composition of claim 4, in the form of a film or 3-dimensional mouldable product.

8. The composition of claim 4, in the form of emulsion, melt- or electro-spun fibres or yarns.

9. A nanocomposite according to claim 1, further comprising free PLA homopolymer in a range of 2 to 15 times the mass of the NCC particles.

10. A nanocomposite according to claim 1, wherein each nanocomposite particle comprises a central nanocrystal of NCC with said several or a plurality of PLA polymer chains independently linked to and radiating from said central nanocrystal, said central nanocrystal having a cross-section dimension of 5-10 nm.

11. A process for producing a particulate nanocomposite of nanocrystalline cellulose (NCC) and polylactic acid (PLA), in which each nanocomposite particle comprises a nanocrystal of NCC having several or a plurality of PLA polymer chains independently linked to and radiating from said nanocrystal, the process comprising ring-opening polymerization of L-lactide in the presence of NCC particles, in a non-aqueous reaction medium, said NCC particles being non-aggregated nanocrystals dispersed in said non-aqueous reaction medium in a concentration of from 1 to 10 g/100 mL and said L-lactide being present in said non-aqueous reaction medium in an amount from 5 to 50 times the mass of said NCC particles.

12. A process according to claim 11, wherein said ring-opening polymerization is carried out under anhydrous conditions.

13. A process according to claim 11, further comprising a step of recovering said nanocomposite from said non-aqueous medium.

14. A process according to claim 13, wherein said recovering comprises precipitating said nanocomposite from said non-aqueous medium, and purifying the resulting precipitate by dialysis.

15. A process according to claim 13, wherein said ring-opening polymerization is carried out in the presence of an initiator for said ring-opening polymerization, said initiator having an alcohol group.

16. A process according to claim 15, wherein said ring-opening polymerization produces free PLA homopolymer in a range of 2 to 15 times the mass of the NCC particles, and at least a portion of said free PLA homopolymer is retained with the recovered nanocomposite as a processing aid.

17. The process of claim 15, wherein said NCC particles have a concentration of from 1.5 to 5 g/100 mL in said non-aqueous reaction medium and said L-lactide is present in said non-aqueous reaction medium in an amount from 15 to 30 times the mass of said NCC particles.

18. A process according to claim 11, wherein said ring-opening polymerization is carried out in an organic solvent.

19. A process according to claim 18, wherein said organic solvent is dimethyl sulfoxide.

20. A process according to claim 11, wherein said ring-opening polymerization is carried out at an elevated temperature in the presence of a catalyst.

21. A process according to claim 7, wherein said elevated temperature is about 100° C. to about 150° C.

22. A process according to claim 21, wherein said ring-opening polymerization is carried out at said elevated temperature for a period of 1 to 20 hours.

23. A process according to claim 22, wherein said period is 15 to 20 hours.

24. The process of claim 11, wherein each nanocomposite particle comprises a central nanocrystal of NCC with said several or a plurality of PLA polymer chains independently linked to and radiating from said central nanocrystal, said central nanocrystal having a cross-section dimension of 5-10 nm and a length of 5-100 nm.

* * * * *